(12) United States Patent
Lee

(10) Patent No.: US 7,418,980 B2
(45) Date of Patent: Sep. 2, 2008

(54) VACUUM CLEANER HOSE

(75) Inventor: Hyun Mi Lee, Pusan (KR)

(73) Assignee: Bong Hee Kim, Pusan (KR)

( * ) Notice: Subject to any disclaimer, the term of this patent is extended or adjusted under 35 U.S.C. 154(b) by 0 days.

(21) Appl. No.: 11/304,395

(22) Filed: Dec. 15, 2005

(65) Prior Publication Data

US 2006/0185749 A1 Aug. 24, 2006

(30) Foreign Application Priority Data

Dec. 15, 2004 (KR) .................. 10-2004-0106281
Mar. 30, 2005 (KR) .................. 10-2005-0026454

(51) Int. Cl.
*F16L 11/08* (2006.01)
(52) U.S. Cl. .................. 138/121; 138/122; 138/129; 138/150; 138/154; 174/251; 174/70 C; 174/47
(58) Field of Classification Search .............. 138/121, 138/122, 129, 154; 174/47, 94 R, 68.1, 68.3, 174/251, 72 R, 72 A, 70 C; 15/339
See application file for complete search history.

(56) References Cited

U.S. PATENT DOCUMENTS

| | | | | |
|---|---|---|---|---|
| 2,516,864 A * | 8/1950 | Gilmore et al. | ............ | 156/143 |
| 3,300,571 A * | 1/1967 | Downey et al. | ............ | 174/47 |
| 3,495,628 A * | 2/1970 | Boender | ............ | 138/114 |
| 3,679,531 A * | 7/1972 | Wienand et al. | ............ | 428/33 |
| 4,186,778 A * | 2/1980 | Carey | ............ | 138/103 |
| 4,196,031 A * | 4/1980 | Lalikos et al. | ............ | 156/143 |
| 4,203,476 A * | 5/1980 | Vitellaro | ............ | 138/122 |
| 4,310,946 A * | 1/1982 | Baker et al. | ............ | 15/363 |
| 4,342,612 A * | 8/1982 | Lalikos et al. | ............ | 156/143 |
| 4,354,051 A * | 10/1982 | Kutnyak | ............ | 174/47 |
| 5,416,270 A * | 5/1995 | Kanao | ............ | 174/47 |
| 5,555,915 A * | 9/1996 | Kanao | ............ | 138/133 |
| 5,601,119 A * | 2/1997 | Kanao | ............ | 138/133 |
| 5,727,598 A * | 3/1998 | Stuhlreyer | ............ | 138/129 |
| 6,367,510 B1 * | 4/2002 | Carlson | ............ | 138/121 |
| 6,932,119 B2 * | 8/2005 | Carlson | ............ | 138/121 |
| 7,156,127 B2 * | 1/2007 | Moulton et al. | ............ | 138/122 |
| 2004/0016469 A1 * | 1/2004 | Lee | ............ | 138/129 |

* cited by examiner

*Primary Examiner*—Patrick F Brinson
(74) *Attorney, Agent, or Firm*—Baker Botts LLP; Chanq Sik Kim

(57) ABSTRACT

The present invention relates to a vacuum cleaner hose manufactured by continuously spirally winding one row or two rows of band-shaped materials extruded with an electric wire inserted therein. The vacuum cleaner hose is formed by spirally winding and sticking a band-shaped material having protrusions connected to each other in a line. In one embodiment, the vacuum cleaner hose is formed from one row of the band-shaped material 2 having a plurality of the hollow protrusions 4 inserted with the electric wire 5 and at least one hollow protrusion 4a inserted with no electric wire 5 is formed into the hose 1. In another embodiment, the vacuum cleaner hose is formed from two rows of the band-shaped materials 2 in which the protrusions of only one row of the band-shaped materials 2 are inserted with the electric wire 5. In still another embodiment, the hose 1 is formed from two rows of the band-shaped materials in which each of the two rows of the band-shaped materials 2 has the hollow protrusions 4 inserted with the electric wire 5, and the hollow protrusions 4a inserted with no electric wire 5. Thus, the amount of use of the electric wire 5 in the hose 1 is reduced.

15 Claims, 28 Drawing Sheets

VACUUM CLEANER HOSE

CROSS-REFERENCE TO RELATED APPLICATION

The present application claims priority under 35 U.S.C. § 119 from Korean Applications No. 10-2004-0106281 filed on Dec. 15, 2004 and No. 10-2005-0026454 filed on Mar. 20, 2005, and the entire disclosure of both prior applications is incorporated herein by reference.

BACKGROUND OF THE INVENTION

The present invention relates to a vacuum cleaner hose manufactured by spirally winding and sticking a band-shaped material itself extruded with an electric wire inserted therein.

Generally, vacuum cleaner hoses are manufactured by inserting an electric wire into hollow protrusions of a band-shaped material extruded from dies to have concave cross-sections spaced at a given interval, and spirally winding the band-shaped material having the electric wire inserted in the hollow protrusions. This vacuum cleaner hose functions to apply an electric current to a motor.

Such vacuum cleaner hoses are broadly classified into two categories: a hose in which a two-strand electric wire is inserted in such a manner to operate only one motor to perform the fundamental function of sucking dust, foreign materials and the like; and a hose in which a four-strand electric wire is inserted in such a manner to operate two motors to perform water cleaning functions in addition to the fundamental function of sucking dust and foreign materials.

FIGS. 1 to 8 illustrate vacuum cleaner hoses according to the prior art.

FIG. 1 shows an illustrative process of forming a hose by spirally winding the band-shaped material 2 inserted with the four-strand electric wire 5.

As illustrated in various forms in FIGS. 2, 3, 4 and 5, the band-shaped material 2 for forming the hose 1 comprises one elevated hook 1, and two to four hollow protrusions connected to the hook 1. One or two electric wires 5 are inserted into each of the hollow protrusions 4, and in this state, the hollow protrusions 4 are connected to each other by the cover 3a having a similar shape to the hook 3.

Namely, FIG. 2 shows that the two-strand electric wire 5 is inserted into each of the hollow protrusions 4, FIG. 3 shows that the four-strand electric wire 5 is inserted into each of the hollow protrusions 4, and FIG. 4 shows that both two-strand electric wire 5 and the four-strand electric wire 5 are inserted into any one of the hollow protrusions 4.

And, FIG. 5 shows that two four-strand electric wires 5 are inserted into each of the hollow protrusions 4.

Each of the band-shaped materials 2 having the above described configurations is spirally wound so that the hook 3 located at one side of each of the band-shaped materials 2 covers the upper surface of the hollow protrusion 4 located at the other side while it is stuck to itself. As a result, as shown in FIGS. 6, 7 and 8, the vacuum cleaner hose 1 is manufactured in which one or two electric wires 5 is inserted in each of the hollow protrusions 4.

Namely, FIG. 6 shows the case where one electric wire 5 is inserted into each of the hollow protrusions 4, like the cases of FIGS. 2 and 3. FIG. 7 shows the case where two four-strand electric wires 5 are inserted into one of three hollow protrusions 4, and one four-strand electric wire 5 is inserted into each of the remaining two hollow protrusions 4, like the case of FIG. 4. FIG. 8 shows the case where two four-strand electric wires are inserted into each of two hollow protrusions 4, like the case of FIG. 4.

Accordingly, in the prior vacuum cleaner hoses as shown in FIGS. 1 to 8, one or two electric wires 5 are inserted into each of the protrusions wound over the full length, and thus, there is a problem in that they form an excessively dense and wasteful structure in view of the fact that the main function of the electric wires 5 is only to apply power to a motor.

Furthermore, since the electric wires 5 are made of expensive copper wires, the larger the amount of use of the electric wires 5, the higher the production cost of the resulting product. Thus, the prior vacuum cleaner hoses having an excessively dense structure have the problem of a reduction in economic efficiency above all things. Another problem is that the prior electric wires have a relatively high unit weight which makes their transport or handling inconvenient.

SUMMARY OF THE INVENTION

Accordingly, the present invention has been made to solve the above-mentioned problems occurring in the prior art, and an object of the present invention is to provide a vacuum cleaner hose having a structure which overcomes the problem of an excessively dense electric wire structure, the problem in the prior vacuum cleaner hose, and thus, sharply reduces the amount of use of electric wires, greatly reduces the production cost of the hose, and has a lighter weight and a better flexibility.

The above object is accomplished by a changed conception where at least one protrusion inserted no electric wire is additionally formed on the prior band-shaped material having an electric wire inserted into each of the hollow protrusions, thus relatively reducing the insertion density of electric wires in the band-shaped material.

The present invention according to this conception provides a vacuum cleaner hose 1 formed by spirally winding a band-shaped material 2 having a plurality of protrusions connected to each other in a line.

In one embodiment of the present invention, a vacuum cleaner hose is made of a band-shaped material having a plurality of protrusions in a line, where the vacuum cleaner hose is formed by spirally winding and sticking the band-shaped material, wherein at least one of the protrusions is hollow and at least one of the protrusion is inserted with at least one electric wire, wherein the hollow protrusion is integrally connected to the protrusion with the electric wire.

In another embodiment of the present invention, the vacuum cleaner hose is made of first row band-shaped material and second row band-shaped material each having a plurality of protrusions, where the vacuum cleaner hose is formed by continuously spirally winding and sticking the first row band-shaped material against the second row band-shaped material, wherein the protrusions of the first row band-shaped material are inserted with one or more electric wires, and the protrusions of the second row of the band-shaped material are not inserted with any electric wire In another embodiment, the vacuum cleaner hose is made of a plurality of rows of band-shaped materials each having a plurality of protrusions, where the vacuum cleaner hose is formed by continuously spirally winding and sticking the plurality of rows of band-shaped materials together, wherein at least one of the protrusions is inserted with an electric wire and at least one of the protrusions has no electric wire therein.

In still another embodiment, the vacuum cleaner hose 1 is formed by continuously spirally winding and sticking two rows of band-shaped materials 2-2 themselves in a line, in which each of the band-shaped materials 2-2 has a plurality of protrusions 4 inserted with an electric wire and at least one protrusion inserted with no electric wire.

Another embodiment of the present invention also uses an electric wire, which is made of multiple thin electric wires, which provide flexibility and durability to the hose.

It will be understood that spirally winding three rows or more of the band-shaped materials 2 to form the vacuum cleaner hose is also within the scope of the present invention.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the present invention will be described in more detail with reference to the accompanying drawings.

FIGS. 9 to 12 illustrate band-shaped materials 2 according to preferred embodiments of the present invention, in which one hollow protrusion 4a is formed on one side of two to four hollow protrusions inserted with the electric wire 5.

Figure 1:
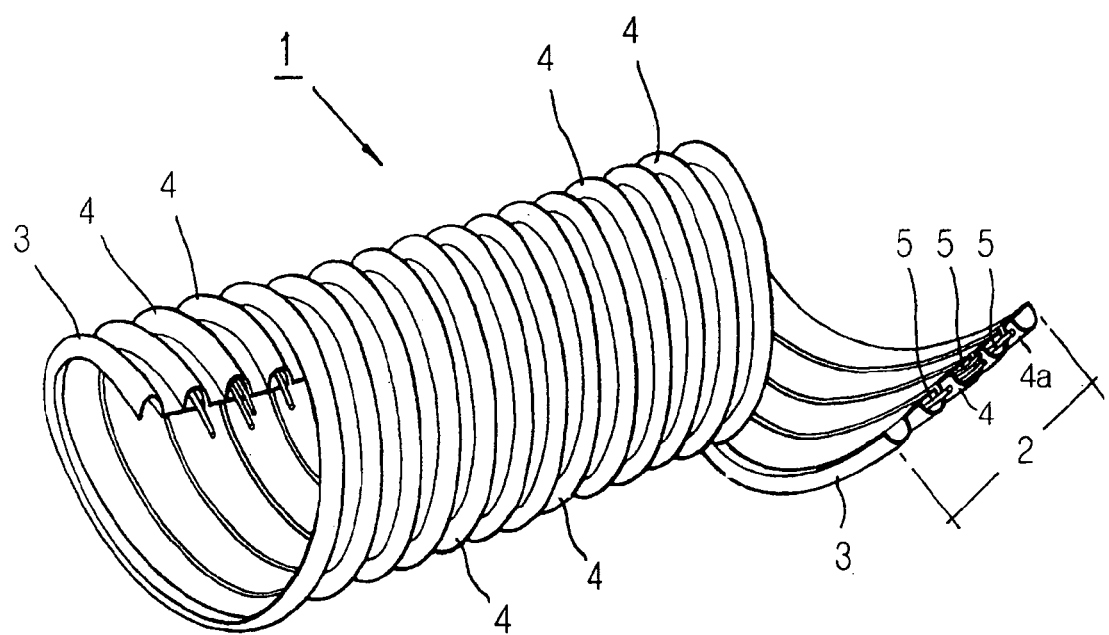
FIG. 1 is a perspective view illustrating a part of the prior vacuum cleaner hose formed by spirally winding a band-shaped material in which hollow protrusions inserted with an electric wire are connected to each other in a line.
Figure 2:
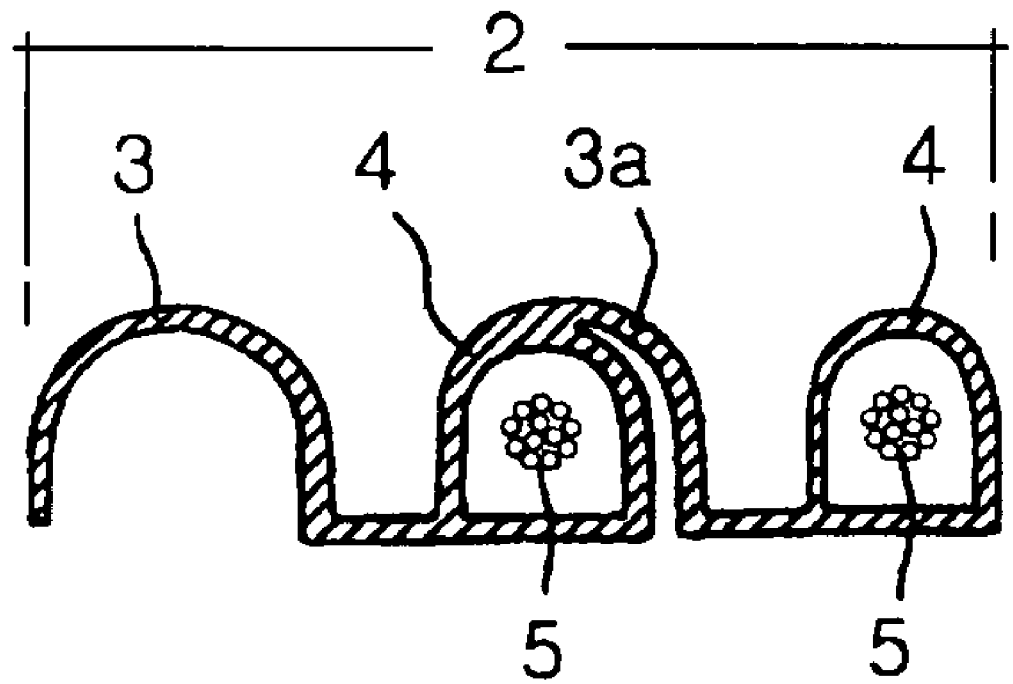
FIGS. 2, 3, 4 and 5 are cross-sectional views each illustrating the prior band-shaped material in which all protrusions are inserted with an electric wire.
Figure 3:
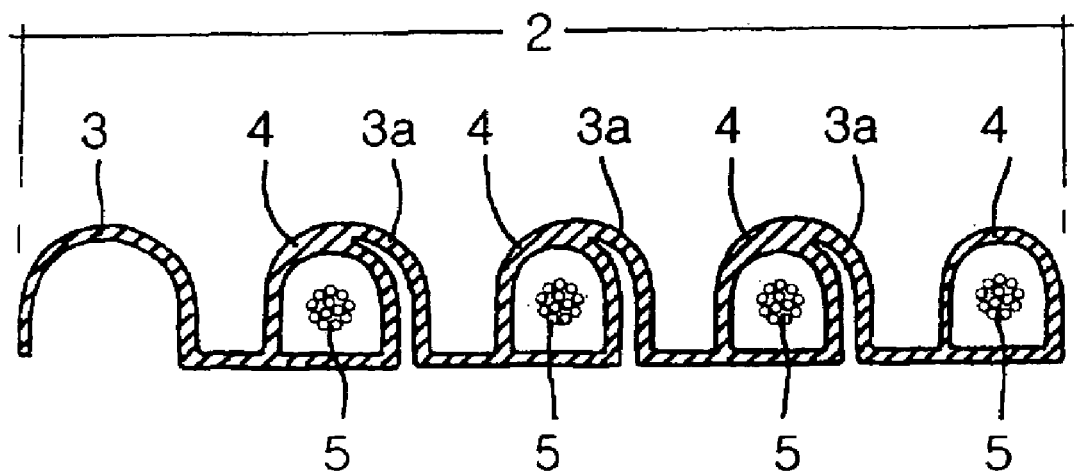
Figure 4:
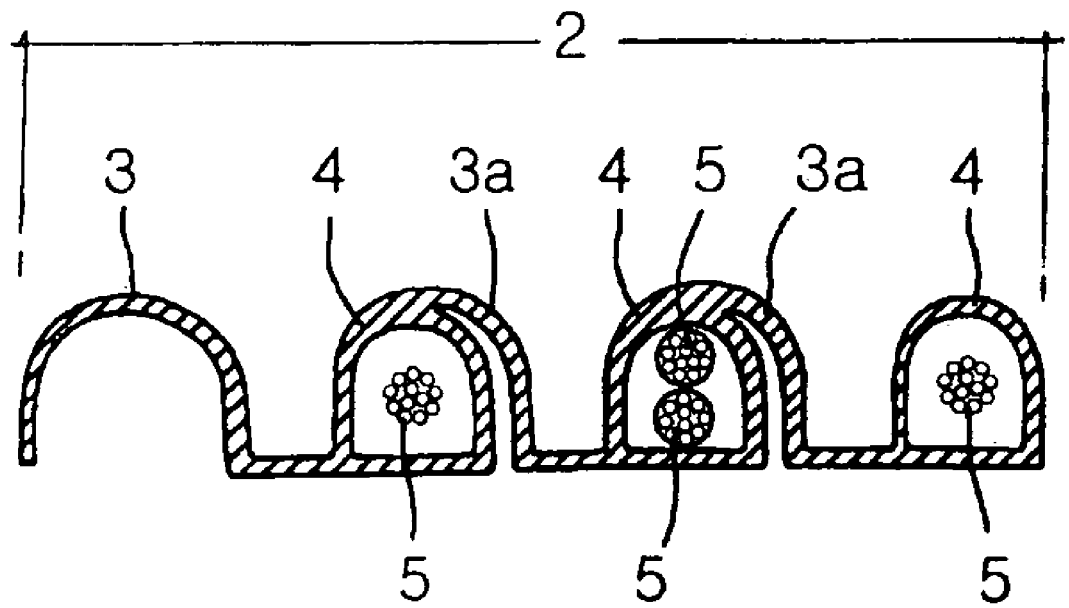
Figure 5:
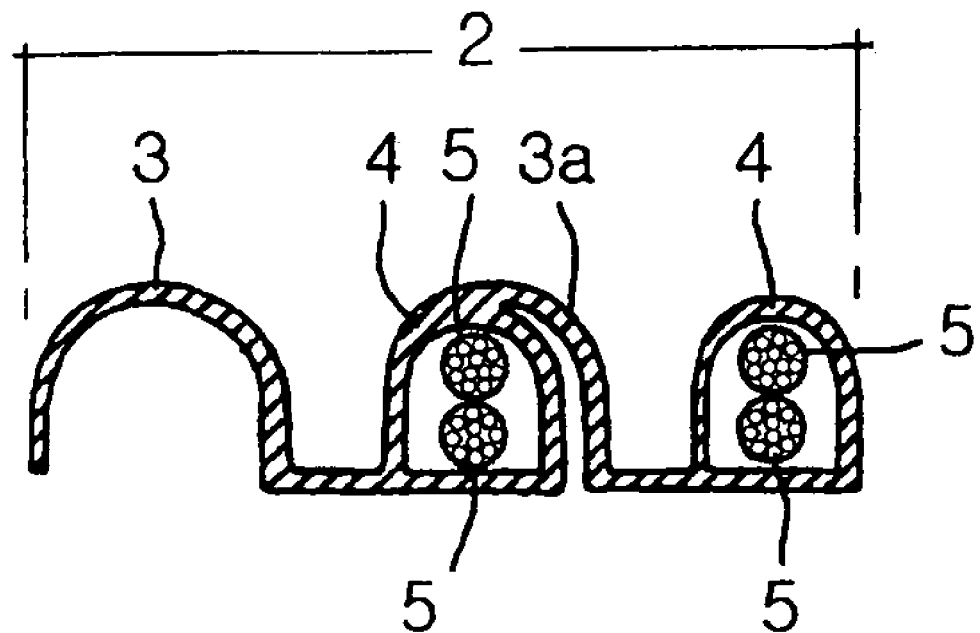
Figure 6:
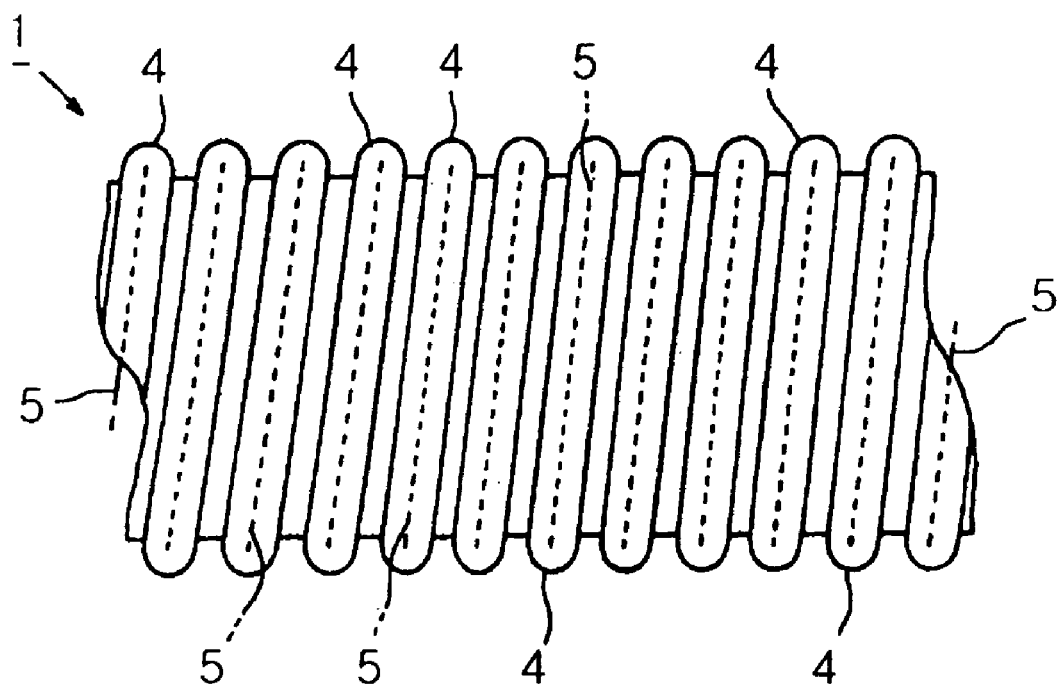
FIG. 6 shows the arrangement of electric wires in each of hoses formed by spirally winding each of the prior band-shaped materials illustrated in FIGS. 2 and 3.
Figure 7:
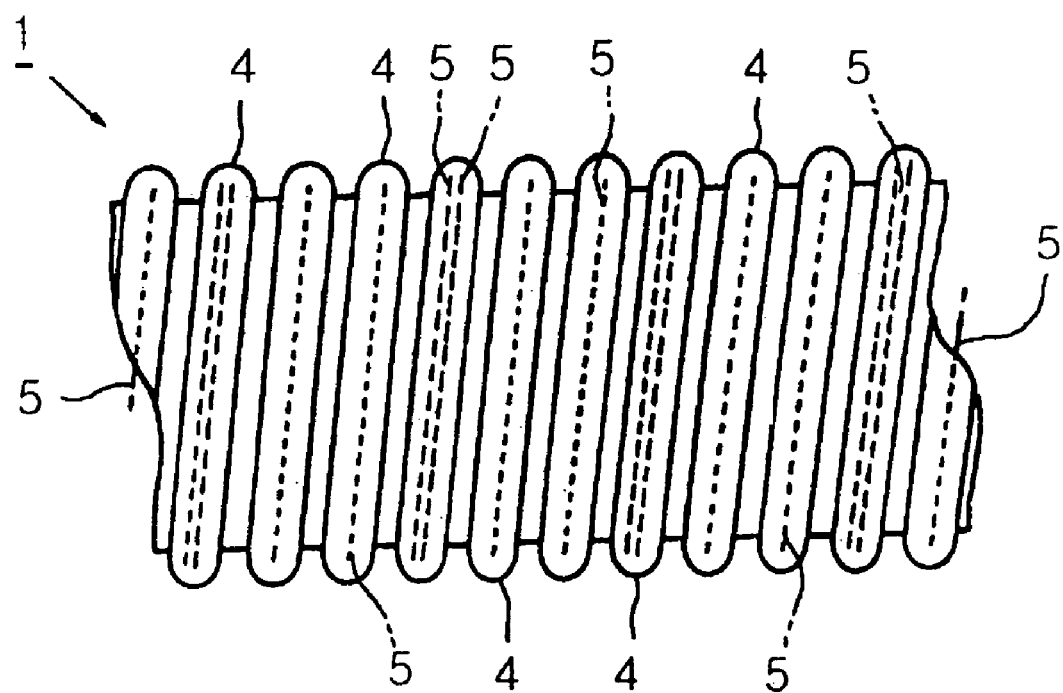
FIG. 7 shows the arrangement of electric wires in a hose formed by spirally winding the prior band-shaped material illustrated in FIG. 4.
Figure 8:
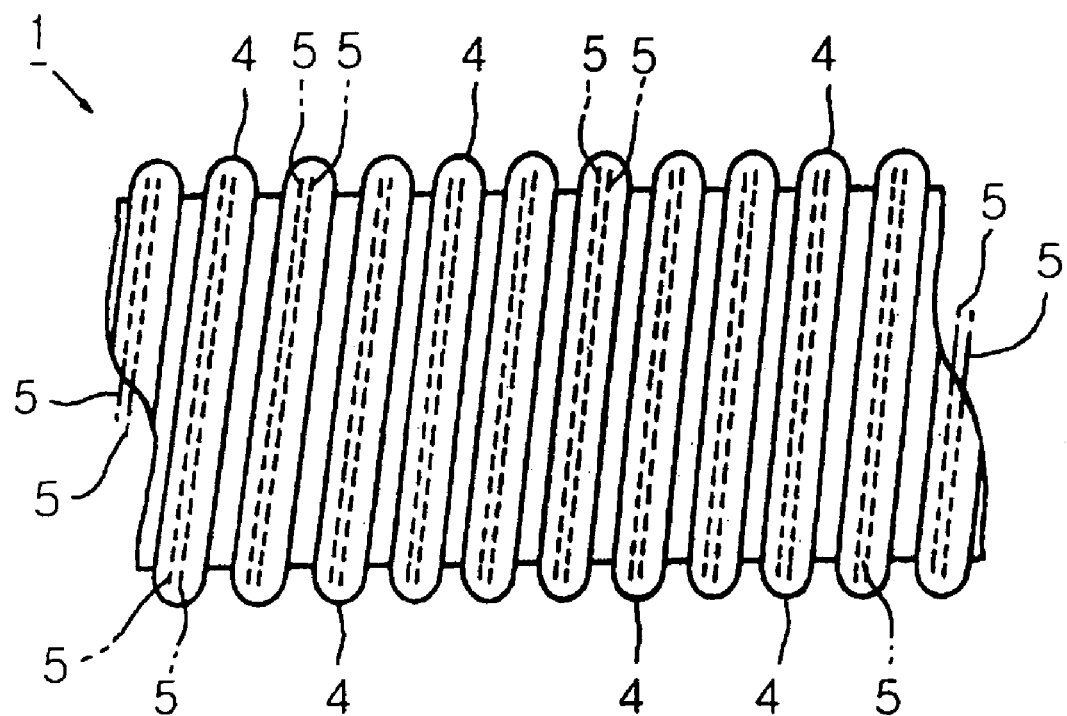
FIG. 8 shows the arrangement of electric wires in a hose formed by spirally winding the prior band-shaped material illustrated in FIG. 5.
Figure 9:
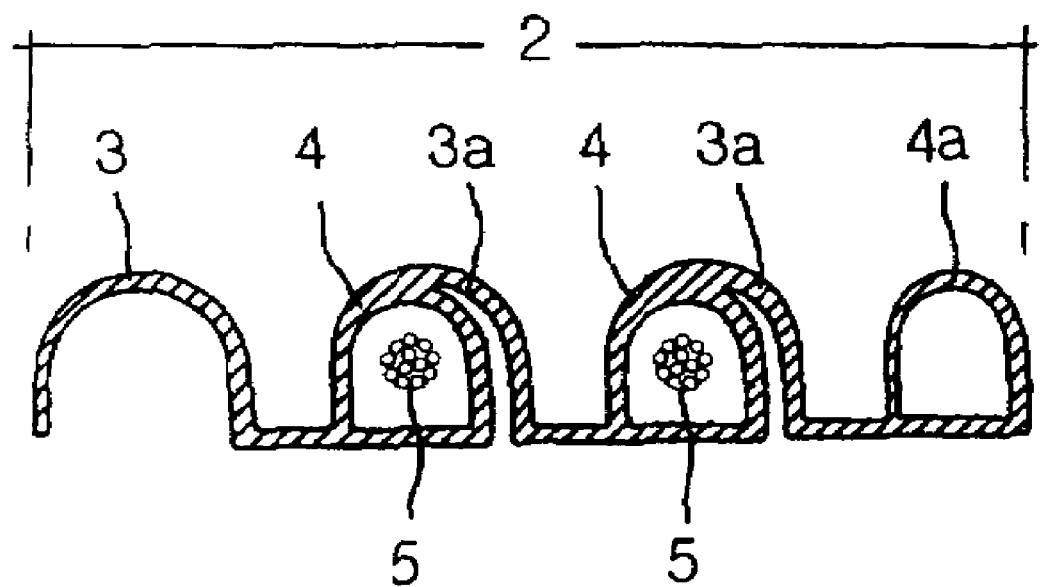
FIGS. 9, 10, 11 and 12 are cross-sectional views illustrating band-shaped materials according to the present invention.
Figure 10:
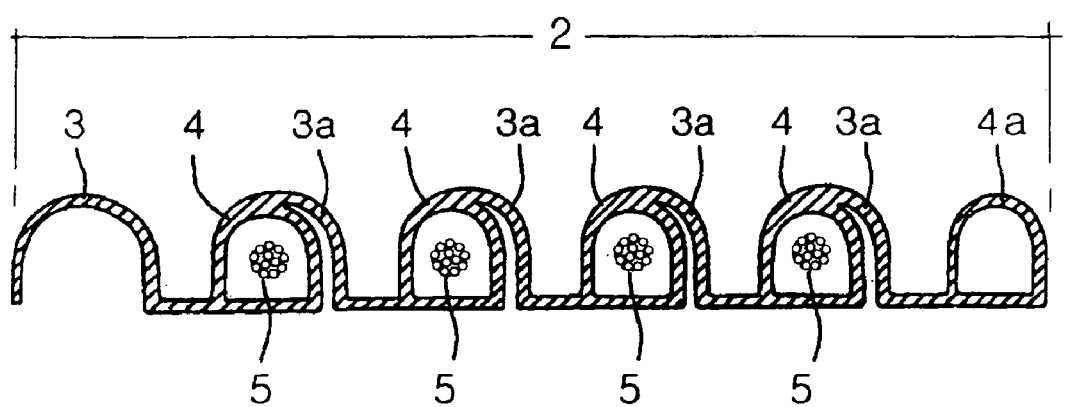
Figure 11:
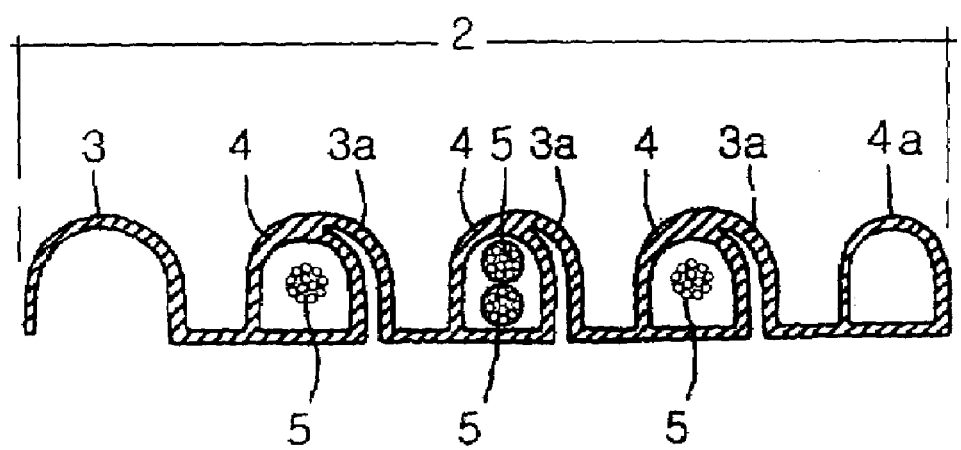
Figure 12:
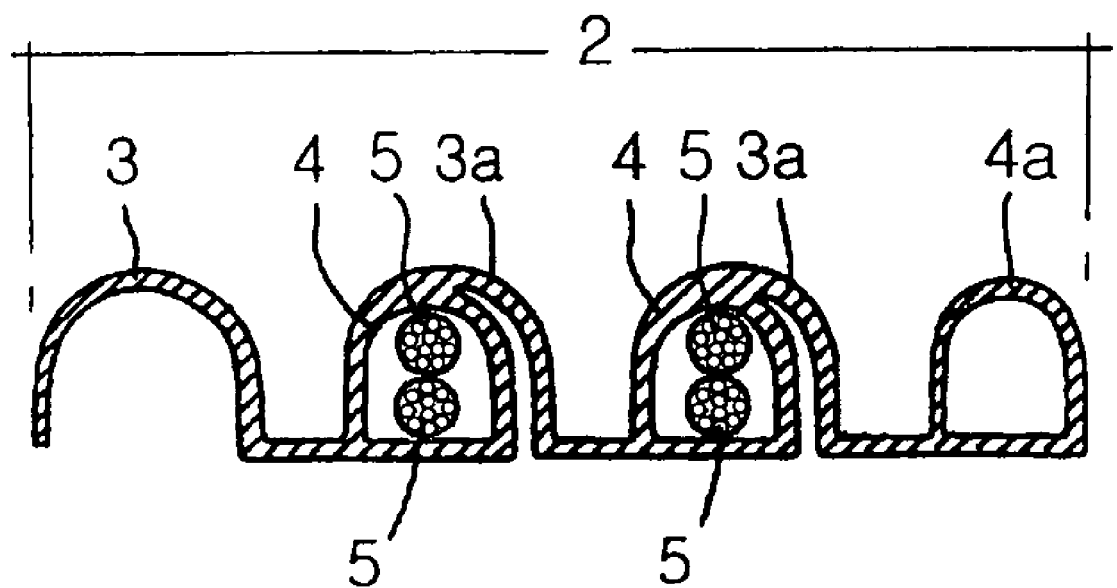

More specifically, FIG. 9 shows that the band-shaped material 2 comprises two hollow protrusions 4 each inserted with one electric wire 5, and one hollow protrusion 4a inserted with no electric wire 5. FIG. 10 shows that the band-shaped material 2 comprises four hollow protrusions 4 each inserted with one electric wire 5, and one hollow protrusion 4a inserted with no electric wire 5. FIG. 11 shows that the band-shaped material 2 comprises two hollow protrusions 4 each inserted with one electric wire 5, one hollow protrusion inserted with two electric wires 5, and one hollow protrusion 4a inserted with no electric wire 5. FIG. 12 shows that the band-shaped material 2 comprises two hollow protrusions 4 each inserted with two electric wires 2, and one protrusion 4a inserted with no electric wire 5.

Figure 17:
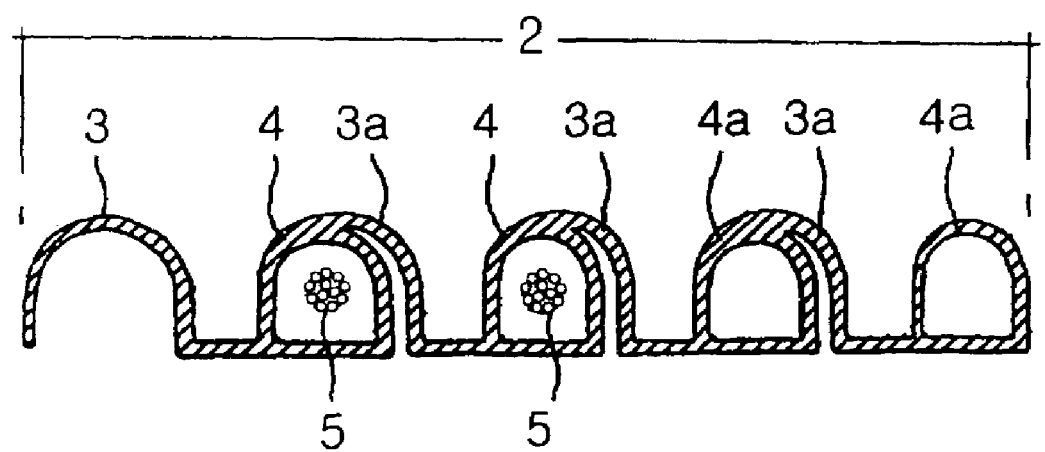
FIGS. 17, 18, 19 and 20 show other embodiments of band-shaped materials according to the present invention.
Figure 18:
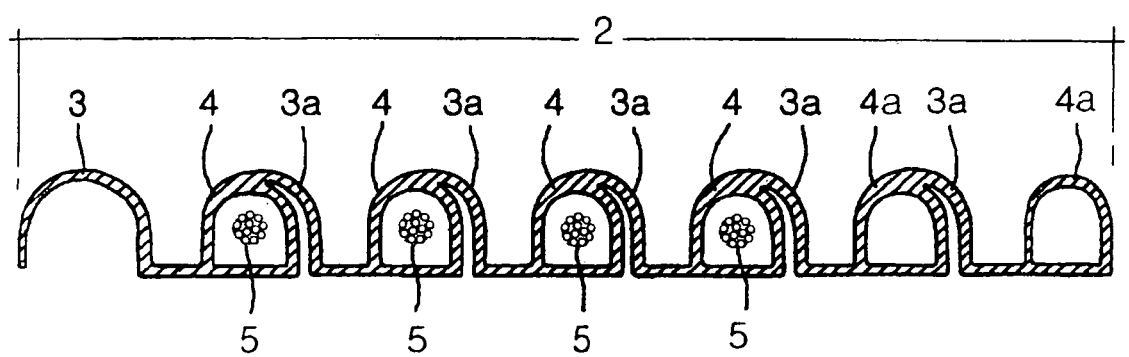
Figure 19:
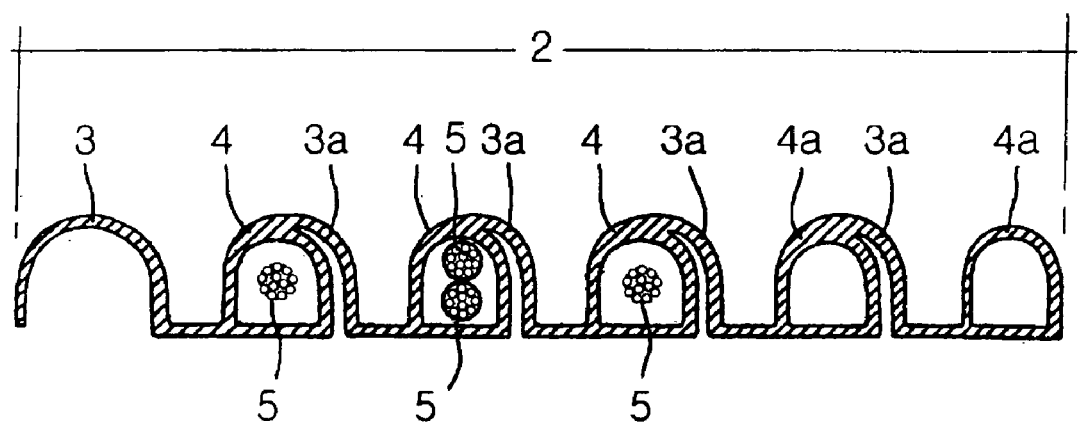
Figure 20:
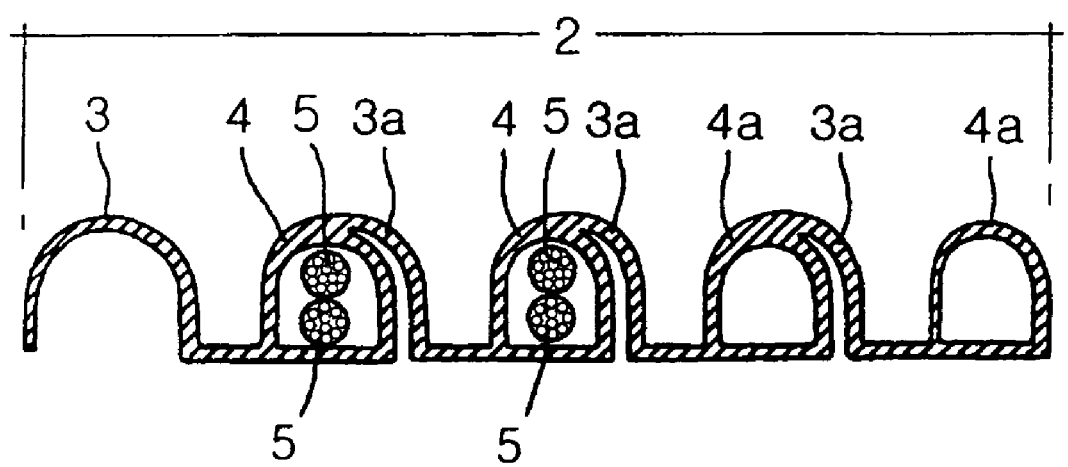

Also, FIG. 17 shows that the band-shaped material 2 comprises two hollow protrusions 4 each inserted with one electric wire 5, and two hollow protrusions 4a inserted with no electric wire 5. FIG. 18 shows that the band-shaped material 2 comprises four hollow protrusions 4 each inserted with one electric wire 5, and two hollow protrusions 4a inserted with no electric wire 5. FIG. 19 shows that the band-shaped material 2 comprises two hollow protrusions 4 each inserted with one electric wire 5, one hollow protrusion 4 inserted with two electric wires 5, and two hollow protrusions 4a inserted with no electric wire 5. FIG. 20 shows that the band-shaped material 2 comprises two hollow protrusions 4 each inserted with two electric wires 5, and two hollow protrusions 4a inserted with no electric wire 5.

One row of each of the band-shaped materials 2 as described above is spirally wound according to a conventional method. In the spiral winding, the hook 3 located at the left side of the material 2 covers the hollow protrusion 4a located at the right side while the band-shaped material 2 adheres to itself, thus forming the vacuum cleaner hose 1. Hereinafter, the arrangement of the electric wires 5 along the length of the vacuum cleaner hose 1 formed from each of the band-shaped materials 2 will be described.

Figure 13:
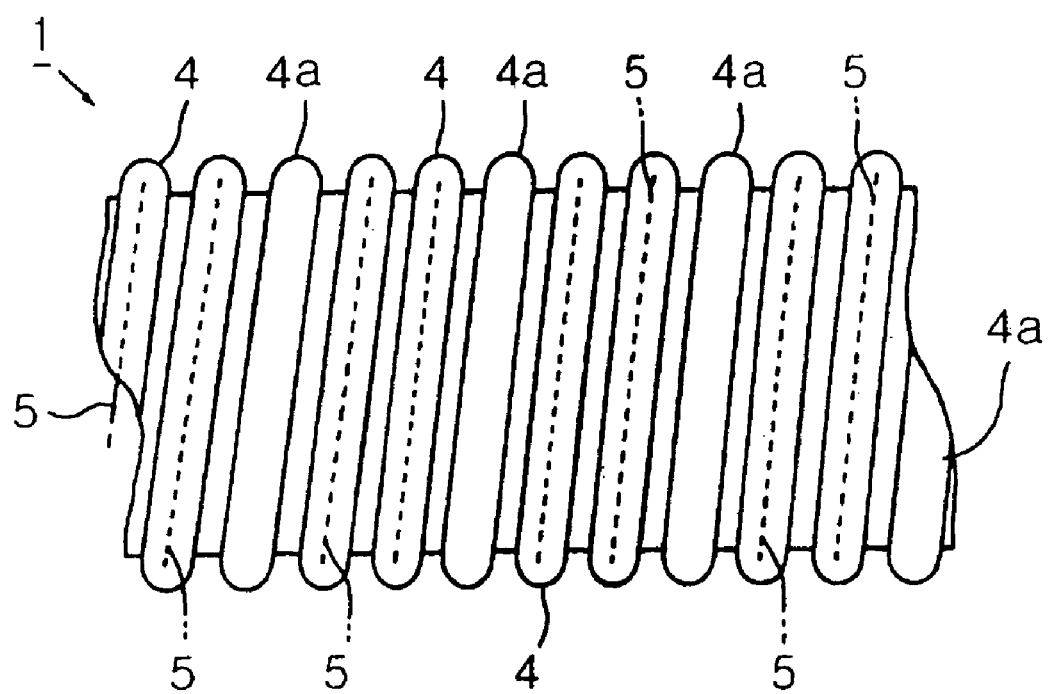
FIGS. 13, 14, 15 and 16 show the arrangement of electric wires in hoses formed by spirally winding the band-shaped materials illustrated in FIGS. 9, 10, 11 and 12, respectively.

FIG. 13 shows the hose 1 formed by spirally winding the band-shaped material 2 shown in FIG. 9, in which only one hollow protrusion 4a is formed on the band-shaped material 2. As can be seen in FIG. 13, the arrangement of the electric wire 5 is omitted in one line following two lines of the hollow protrusions 4 inserted with the electric wire 5, so that the density of arrangement of electric wires 5 along the length of the hose 1 is reduced by about ⅓ as compared to the prior hose.

Figure 14:
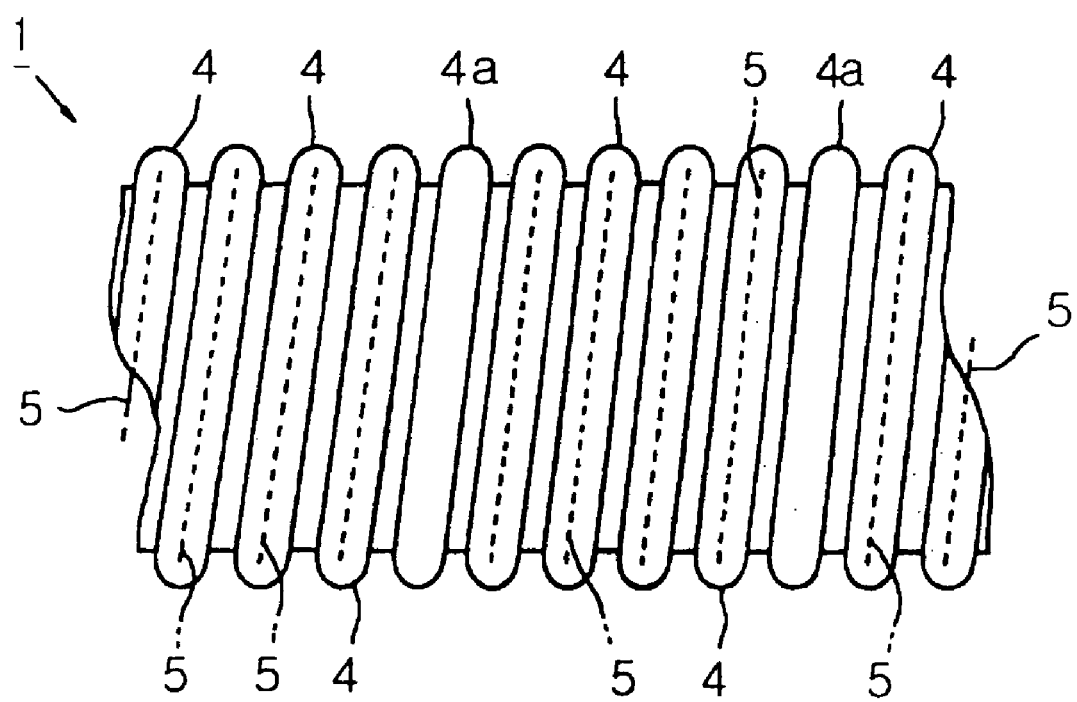
Figure 15:
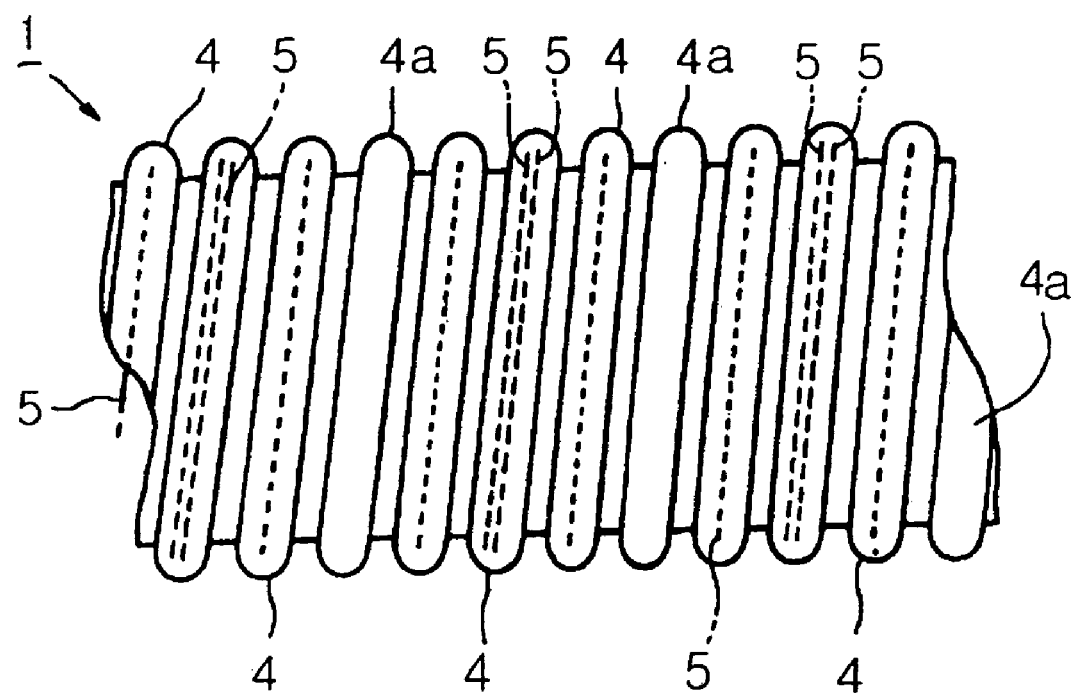

FIGS. 14 and 15 show the hoses 1 formed from the band-shaped materials 2 as shown in FIGS. 10 and 11, respectively. As can be seen in FIGS. 14 and 15, the arrangement of electric wire 5 is omitted in one line following four lines of the hollow protrusions 4, so that the amount of use of electric wire 5 is reduced by about ⅕ as compared to the prior hose.

Figure 16:
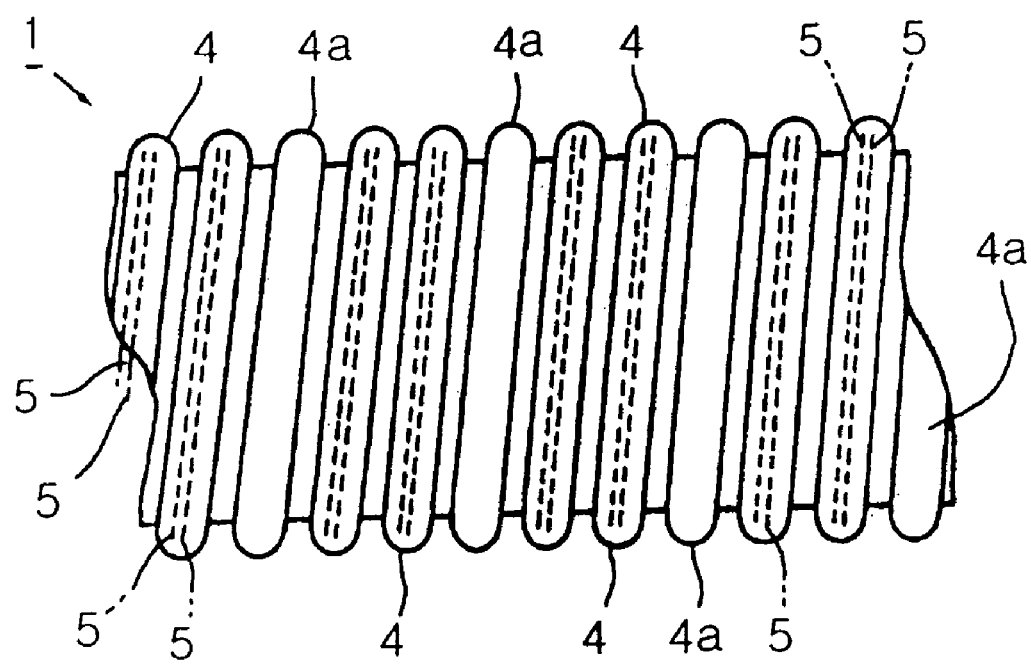

Also, FIG. 16 shows the hose 1 formed from the band-shaped material 2 as shown in FIG. 12. As can be seen in FIG. 16, the arrangement of the electric wire 5 is omitted in one line following two lines of the hollow protrusions 4 each inserted with two electric wires 5, so that the amount of use of the electric wires 5 is reduced by ⅓ as compared to the prior hose.

Figure 21:
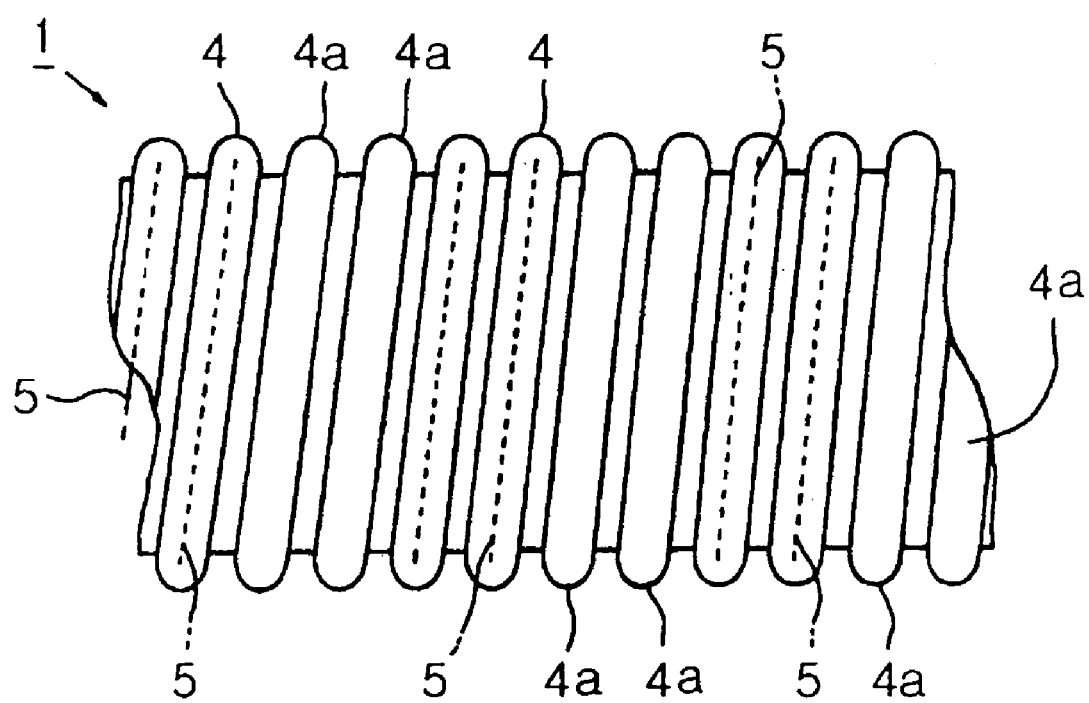
FIGS. 21, 22, 23 and 24 shows the arrangement of electric wires in hoses formed by spirally winding the band-shaped materials illustrated in FIGS. 9, 10, 11 and 12, respectively.

Moreover, FIG. 21 shows the hose 1 formed from the band-shaped material 2 of FIG. 17, in which two hollow protrusions 4a inserted with no electric wire 5 are formed. As can be seen in FIG. 21, the arrangement of the electric wire 5 is omitted in two lines following two lines of the hollow protrusions 4 inserted with the electric wire 2, so that the amount of use of the electric wire 5 is reduced by about ½ as compared to the prior hose.

Figure 22:
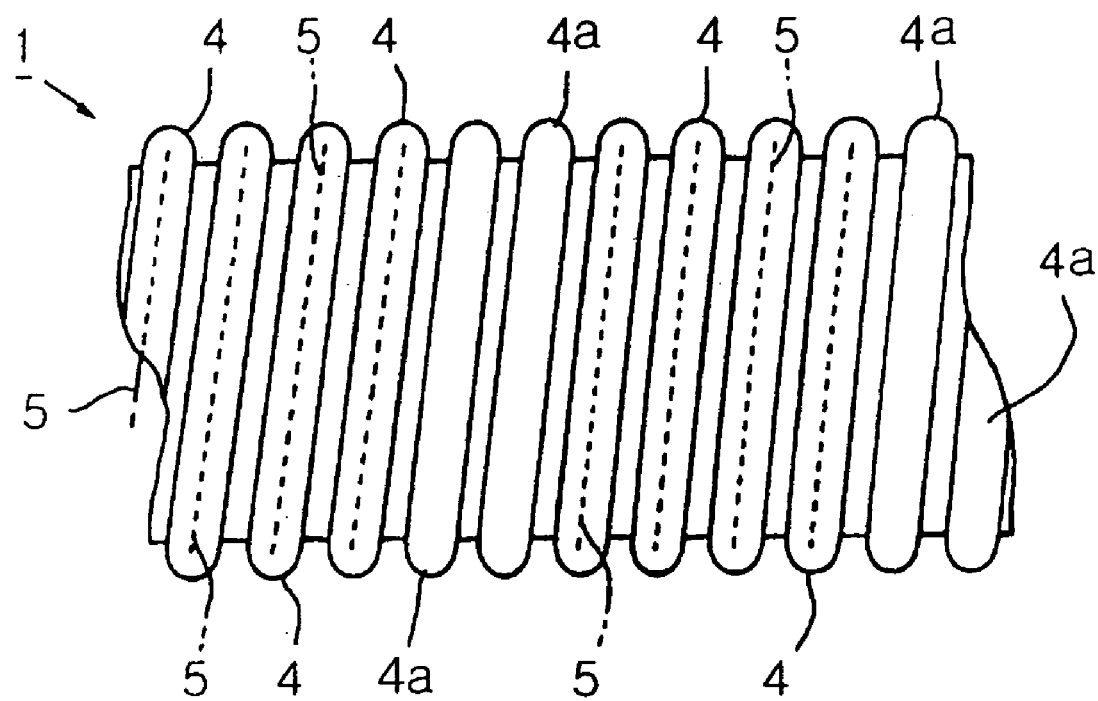
Figure 23:
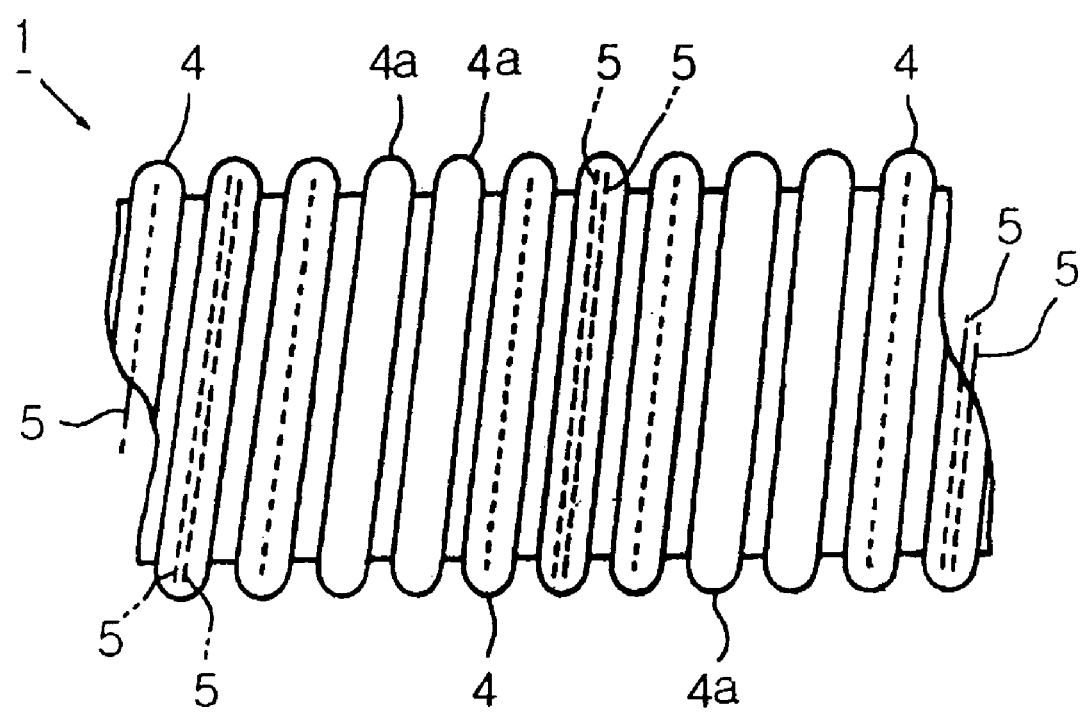
Figure 24:
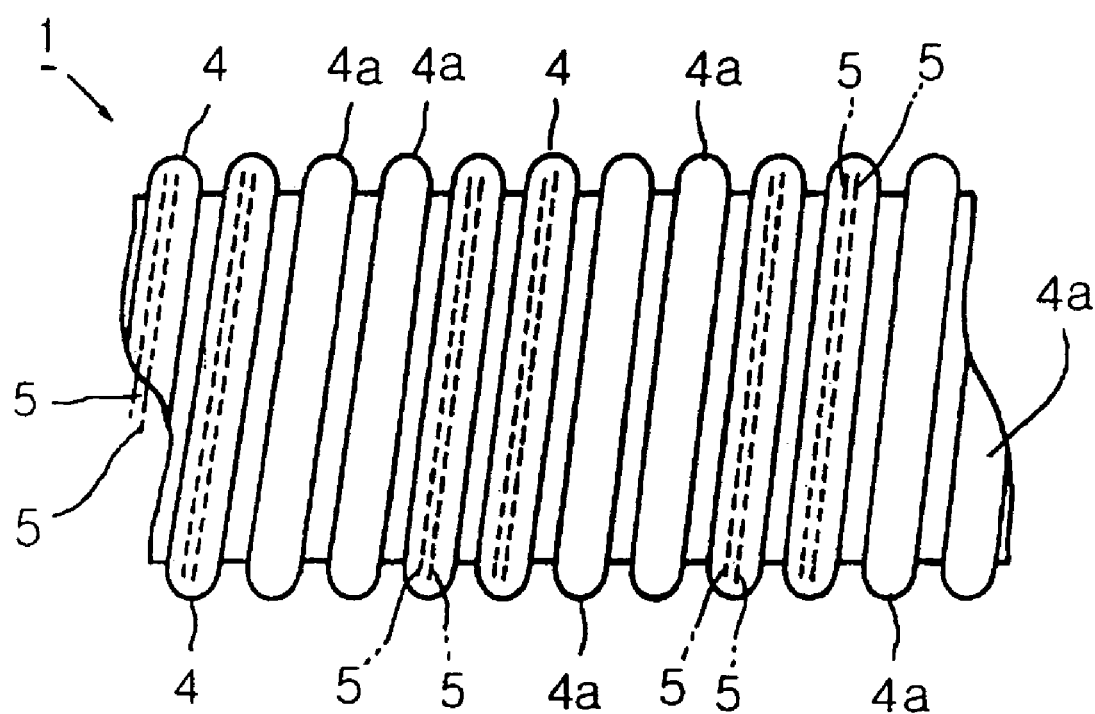

Also, FIGS. 22 to 24 show the hoses formed from the band-shaped materials 2 as shown in FIGS. 18-20, respectively. As can be seen in FIGS. 22-24, the arrangement of the electric wire 5 is omitted in two lines following four lines, three lines or two lines of the hollow protrusions 4 inserted with the electric wire 5, so that the amount of use of the electric wire 5 is reduced by about ⅓ for FIGS. 22 and 23, and by about ½ for FIG. 24, as compared to the prior hose.

As can be seen from the above embodiments, it is a logical conclusion that, as the number of the hollow protrusions 4a inserted with no electric wire 5, which are formed in a line with the hollow protrusions inserted with the electric wire, the amount of a reduction in the use of the electric wires 5 per length of the hose becomes larger.

Accordingly, the present invention is not limited to the above embodiments, and the use of three or more hollow protrusions 4a inserted with the electric wire 5 is also within the scope of the present invention.

According to another embodiment of the present invention, two rows of the band-shaped materials 2 and may also be continuously spirally wound in a line to form the vacuum cleaner hose 1. With respect to this case, FIGS. 25, 26, 27 and 28 show other embodiments of the hollow protrusions 4 inserted with the electric wire 5, and the hollow protrusions 4a.

Figure 25:
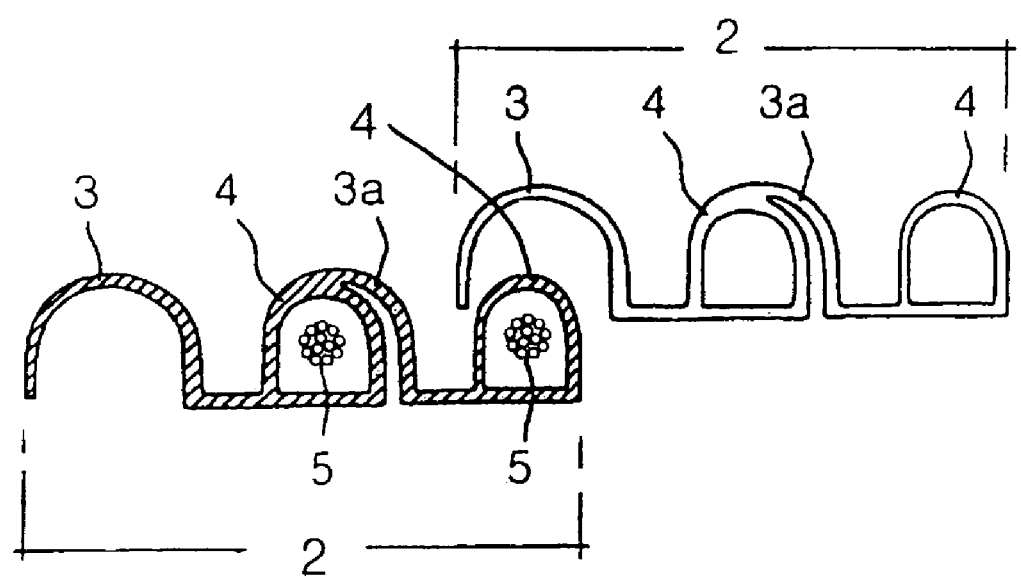
FIGS. 25, 26, 27 and 28 show the state of insertion of electric wires in hoses formed by spirally winding two rows of band-shaped materials in a line.
Figure 26:
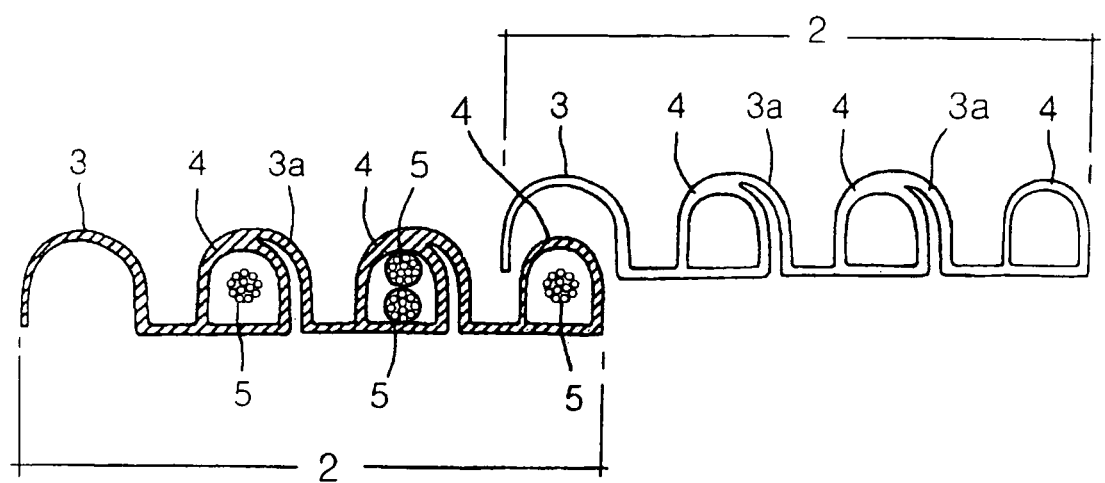

Namely, as shown in FIGS. 25 and 26, two rows of the band-shaped materials 2 consisting of a first row of the band-shaped material 2 having the hollow protrusions 4 inserted with the electric wire 5 and a second row of the band-shaped material 2 having the hollow protrusions 4a inserted with no electric wire 5 are continuously spirally wound in a line, and the connections between the two materials are stuck to each other. Thus, the amount of the electric wire 5 per length of the hose 1 is reduced.

Figure 27:
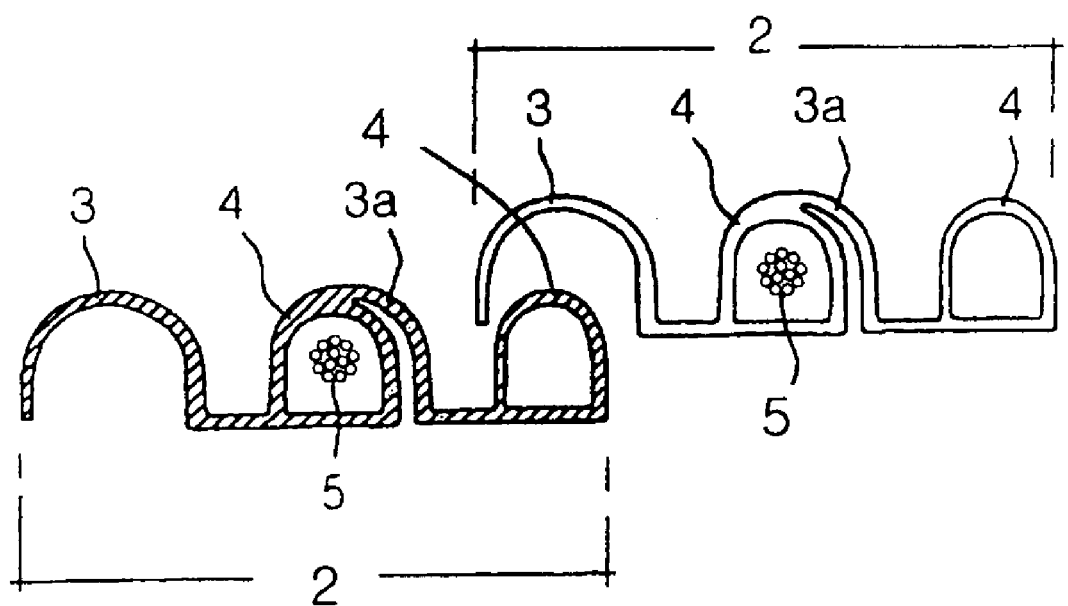
Figure 28:
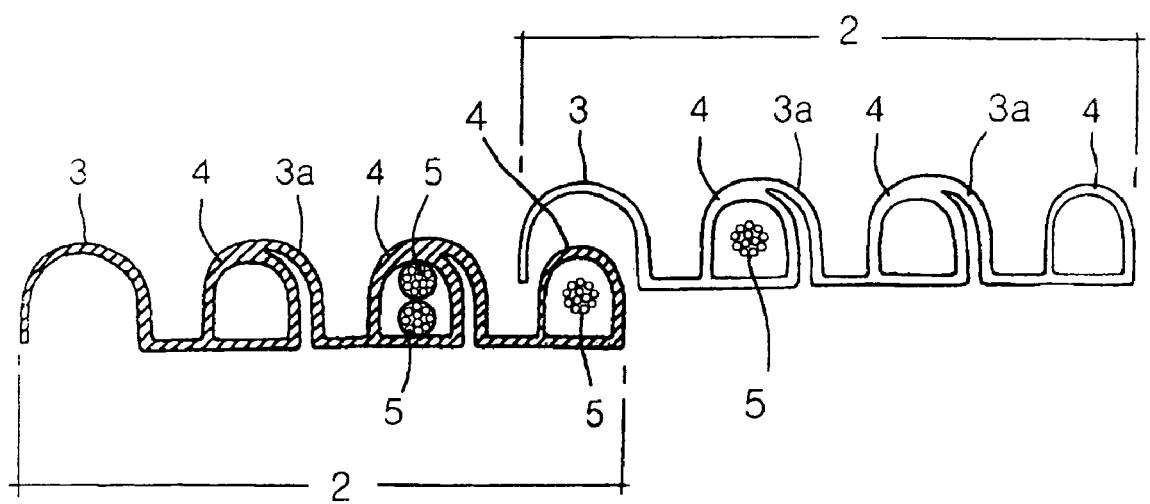

Also, as shown in FIGS. 27 and 28, two rows of the band-shaped materials 2 each having the hollow protrusions 4 inserted with the electric wire 5 and the hollow protrusions 4a inserted with no electric wire 5 are continuously spirally wound in a line to form the vacuum cleaner hose 1. Thus, the amount of use of the electric wires in the hose 1 is reduced.

In the present invention, for the convenience of description, the protrusions inserted with the electric wire 5 are indicated as the hollow protrusions 4, and the protrusions inserted with no electric wire are indicated as the hollow protrusions 4a. However, the protrusions 4a may also be inserted with the electric wire 5, the protrusions 4 may not be inserted with the electric wire 5, and thus, the reference numerals 4 and 4a indicate the hollow protrusions having the same structure.

As can be seen from the foregoing, according to the present invention, the amount of use of the electric wire 5, which is inserted into the hollow protrusions 4 and spirally wound in the vacuum cleaner hose 1, is greatly reduced as compared to the prior art. Accordingly, the present invention provides the economic effect of greatly reducing the production cost of the hose 1 caused by the use of the expensive electric wire 5.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A vacuum cleaner hose comprising a band-shaped material having a plurality of protrusions in a line and a hook portion, where the vacuum cleaner hose is formed by spirally winding and connecting the band-shaped material, wherein at least one of the protrusions is hollow and at least one of the protrusions is inserted with at least one electric wire, wherein the hollow protrusion is integrally connected to the protrusion with the electric wire, and wherein the hook portion located at one end of the band material is configured to cover and connect to a hollow protrusion located at the other side of the band material, when the band material is spirally wound onto itself.

2. The vacuum cleaner hose according to claim 1, wherein the electric wire is made of a plurality of thin electric wires.

3. The vacuum cleaner hose according to claim 1, wherein the number of the protrusions is 3 or higher and a plurality of the protrusions are inserted with the electric wire.

4. The vacuum cleaner hose according to claim 1, wherein one or more protrusions are inserted with more than one electric wire.

5. The vacuum cleaner hose according to claim 1, wherein the number of the protrusions is 3 or higher and the vacuum cleaner hose comprising a plurality of the hollow protrusions.

6. The vacuum cleaner hose according to claim 5, wherein the number of the hollow protrusion is 2.

7. A vacuum cleaner hose comprising a first row band-shaped material and a second row band-shaped material, each row having a plurality of hollow protrusions, where the vacuum cleaner hose is formed by continuously spirally winding and connecting the first row band-shaped material together alternatively with the second row band-shaped material, wherein the protrusions of the first row band-shaped material are inserted with one or more electric wires, and the protrusions of the second row of the band-shaped material are not inserted with any electric wire.

8. The vacuum cleaner hose according to claim 7, wherein the electric wires are made of a plurality of thin electric wires.

9. The vacuum cleaner hose according to claim 7, wherein at least one protrusion of the first row band-shaped material is inserted with one electric wire and at least another protrusion of the first row band-shaped material is inserted with two electric wires.

10. The vacuum cleaner hose according to claim 7, wherein the number of the protrusions of the second row band-shaped material is 3 or higher.

11. A vacuum cleaner hose comprising a plurality of rows of band-shaped materials each band having a plurality of hollow protrusions, where the vacuum cleaner hose is formed by continuously spirally winding and connecting the plurality of rows of band-shaped materials together alternatively, wherein the plurality of rows of band-shaped materials has first and second rows of band-shaped material and at least one of the protrusions of the first row of band-shaped material is inserted with an electric wire and at least one of the protrusions of the second row of band-shaped material has no electric wire therein.

12. The vacuum cleaner hose according to claim 11, wherein the electric wire is made of a plurality of thin electric wires.

13. The vacuum cleaner hose according to claim 11, wherein each of the first and second rows of the band-shaped material is comprised of at least one hollow protrusion without any electric wire and at least one protrusion inserted with at least one electric wire.

14. The vacuum cleaner hose according to claim 13, wherein the number of the rows of the band-shaped materials is 2.

15. The vacuum cleaner hose according to claim 14, wherein at least one row of the band-shaped materials has a protrusion inserted with one electric wire and another protrusion inserted with multiple electric wires.

* * * * *